US010038752B2

(12) United States Patent
Stopel et al.

(10) Patent No.: US 10,038,752 B2
(45) Date of Patent: *Jul. 31, 2018

(54) METHOD AND SYSTEM FOR EXECUTION OF CLIENT-INITIATED OPERATIONS ON FILE HANDLES IN A DISTRIBUTED SERVER SYSTEM

(71) Applicant: Dell Products L.P., Round Rock, TX (US)

(72) Inventors: Anna Stopel, Herzliya (IL); Dina Fine, Herzlia (IL)

(73) Assignee: Dell Products L.P., Round Rock, TX (US)

( * ) Notice: Subject to any disclaimer, the term of this patent is extended or adjusted under 35 U.S.C. 154(b) by 241 days.

This patent is subject to a terminal disclaimer.

(21) Appl. No.: 14/960,556

(22) Filed: Dec. 7, 2015

(65) Prior Publication Data

US 2017/0163741 A1    Jun. 8, 2017

(51) Int. Cl.
*G06F 15/16* (2006.01)
*H04L 29/08* (2006.01)

(52) U.S. Cl.
CPC ........ *H04L 67/146* (2013.01); *H04L 67/1097* (2013.01)

(58) Field of Classification Search
CPC .................................................. H04L 67/1097
See application file for complete search history.

(56) References Cited

U.S. PATENT DOCUMENTS

| 2004/0006565 | A1* | 1/2004 | Shmueli | G06F 17/30067 |
| 2012/0151249 | A1* | 6/2012 | Swan | G06F 11/1443 714/4.11 |
| 2013/0007518 | A1* | 1/2013 | George | H04L 67/06 714/16 |

* cited by examiner

*Primary Examiner* — Padma Mundur
(74) *Attorney, Agent, or Firm* — Pearl Cohen Zedek Latzer Baratz LLP

(57) ABSTRACT

A method and a system for execution of client-initiated operations on file handles in a distributed server system. The method may include: generating a file handle, responsive to a connect request sent by a client to a distributed file system, wherein the handle has a handle identifier that is unique throughout the distributed file system; embedding a protocol server identifier within the handle identifier, wherein the protocol server identifier relates to a protocol server to which the handle is assigned, wherein the protocol server is a data structure containing a list of all valid handles that belong to a specific file; sending an operation request from said client to the distributed file system, wherein the file system operation request includes the handle identifier; and locating the protocol server based on the protocol server identifier embedded within the handle identifier upon receiving the operation request at the distributed file system.

15 Claims, 5 Drawing Sheets

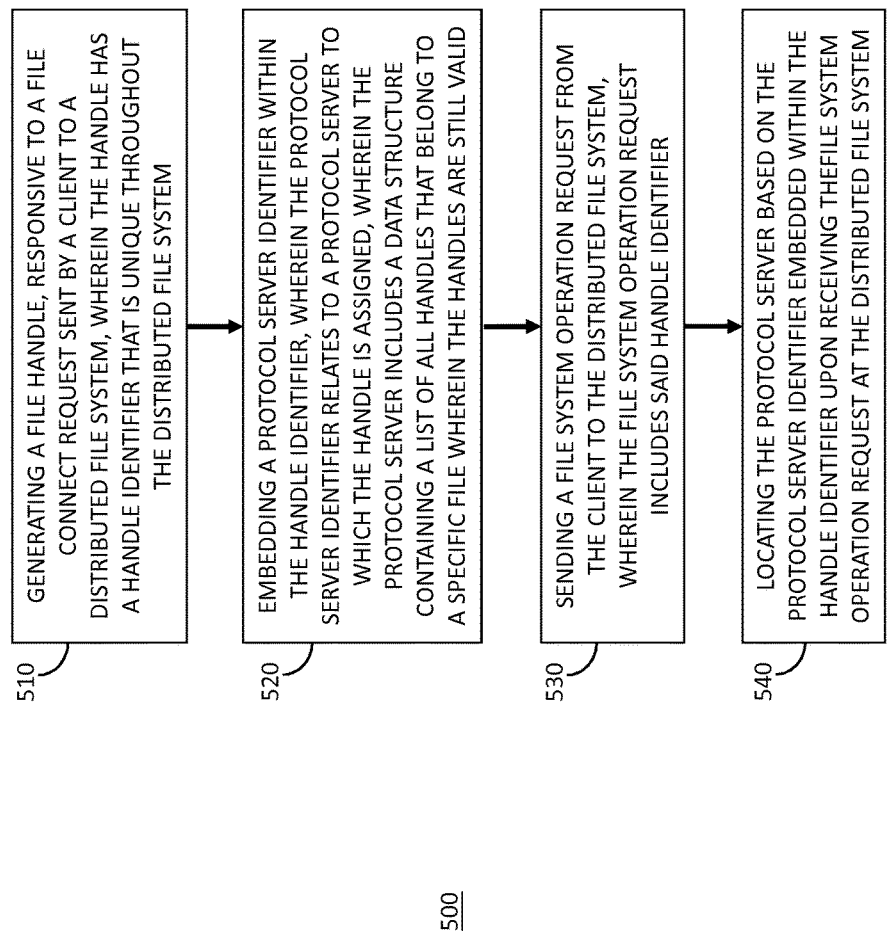

METHOD AND SYSTEM FOR EXECUTION OF CLIENT-INITIATED OPERATIONS ON FILE HANDLES IN A DISTRIBUTED SERVER SYSTEM

FIELD OF THE INVENTION

The present invention relates generally to the field of storage, and more particularly to distributed shared files systems.

BACKGROUND OF THE INVENTION

FIG. 1 is a block diagram illustrating non-limiting exemplary architecture of a distributed file system 100 implementing a Network Attached Storage (NAS) in accordance with the prior art. Distributed file server 120 may include a plurality of nodes (aka controllers) 130-1 to 130-x connected to a bus 180 operating in Internet Small Computer Systems Interface (iSCSI), a fiber channel (FC) or the like.

Bus 180 connects distributed file server 120 to a plurality of block storage devices 190 possibly configured as a part of a Storage Area Network (SAN) device aligned, for example, in a Redundant Array of Independent Disks (RAID) configuration.

Each of nodes 130-1 to 130-x may include a central processing unit (CPU) 160-1 to 160-x respectively, and memory units 150-1 to 150-x respectively, on which several processes are being executed. Nodes 130-1 to 130-x may communicate with a plurality of clients over network protocols such as Network File System (NFS) and Server Message Block (SMB).

Some of the processes running over nodes 130-1 to 130-x may include file system daemons (FSDs) 170-1 to 170-x. Each of nodes 130-1 to 130-x may include one or more FSDs which serve as containers for services and effectively control files in distributed file server 120.

Files in distributed file server 120 are distributed across FSDs 170-1 to 170-x and across nodes 130-1 to 130-x. Distributed file server 120 may also include file servers 140-1 to 140-x in at least one of nodes 130-1 to 130-x, wherein each of file servers 140-1 to 140-x may receive file system connect requests 112 from clients such as client machine 110.

Such client machine 110 may include, in a non-limiting example, Windows™ clients communicating over Server Message Block (SMB) protocol. Upon receiving such a connect request 112, file servers 140-1 to 140-x refer the requests to one of FSDs 170-1 to 170-x that holds the required file.

In accordance with the SMB protocol, each of FSDs 170-1 to 170-x may include an SMB server (not shown here) which is a process running on the node and configured to control the network communication in accordance with the SMB protocol. When a file is first requested by a client, for each client requesting a file, the SMB server allocates a unique persistent file handle associated with a specific client. The handle is an object which determines file name and other identifiers and the state which indicates the permissions of a specific client and other clients, and what other operations are the other clients are prevented from (aka share mode).

In SMB protocol, the handle serves as a mechanism allowing a specific client to establish or reestablish connection to a certain file after disconnection. In a case that SMB3 protocol is implemented, system failovers and/or node/FSD exchanges may be transparent to a client. That is, if connection with an FSD is lost, for example if a node or FSD fails or if the file server redirects a file to another node or FSD for better load balancing, the client may be reconnected to another node/FSD without interruption with the client's operations. In such cases, the persistent handle state must be preserved from the moment of connection loss and until client is reconnected again, for example to the other node/FSD.

FIG. 2 is a block diagram illustrating non-limiting exemplary architecture of a distributed file server system in accordance with the prior art. Distributed file server system 200 may include a plurality of nodes 210-0 and 210-1 and a storage disk 220. Each node may include a plurality of file system daemons (FSDs) 211-0 to 211-3 and 212 to 212-1 that control files in the distributed system. The files in the system are distributed across the FSDs and across the nodes of the system. The distributed system may also include a file server 230 in at least one of the nodes, wherein the file server receives file system requests from clients such as, for example, Windows™ clients over Server Message Block 2.0 (SMB 2) protocol, such as SMB client 240 and refers the requests to the proper FSD that holds the required file.

For each client requesting a file, the file server allocates a unique persistent file handle associated with a specific client, i.e. a mechanism allowing a specific client to establish or reestablish connection to a certain file. Such persistent handle may have a unique identity (ID) across the entire distributed system, thus allowing a client to establish or reestablish connection with the file via any of the nodes and to resume its work with previously allocated handle, by including the unique handle ID with the connection request. The unique ID is provided to the client by the file server upon creation of the handle. Once receiving client's request including the unique ID, the server may locate the handle state of the respective handle and may allow the client to resume connection with the file.

However, the allocation of the file across the plurality of nodes of the distributed system may be time and resources consuming.

SUMMARY OF THE INVENTION

Some embodiments of the present invention provide a method and a system for execution of client-initiated operations on file handles in a distributed server system. The method may include: generating a file handle, responsive to a connect request sent by a client to a distributed file system, wherein the handle has a handle identifier that is unique throughout the distributed file system; embedding a protocol server identifier within the handle identifier, wherein the protocol server identifier relates to a protocol server to which the handle is assigned, wherein the protocol server is a data structure containing a list of all valid handles that belong to a specific file; sending an operation request from the client to the distributed file system, wherein the file system operation request includes the handle identifier; and locating the protocol server based on the protocol server identifier embedded within the handle identifier upon receiving the operation request at the distributed file system.

The system in accordance with embodiments of the present invention, implements the aforementioned method on a distributed shared file system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 is a high level flowchart illustrating non-limiting exemplary method in accordance with embodiments of the present invention.

Figure 1:
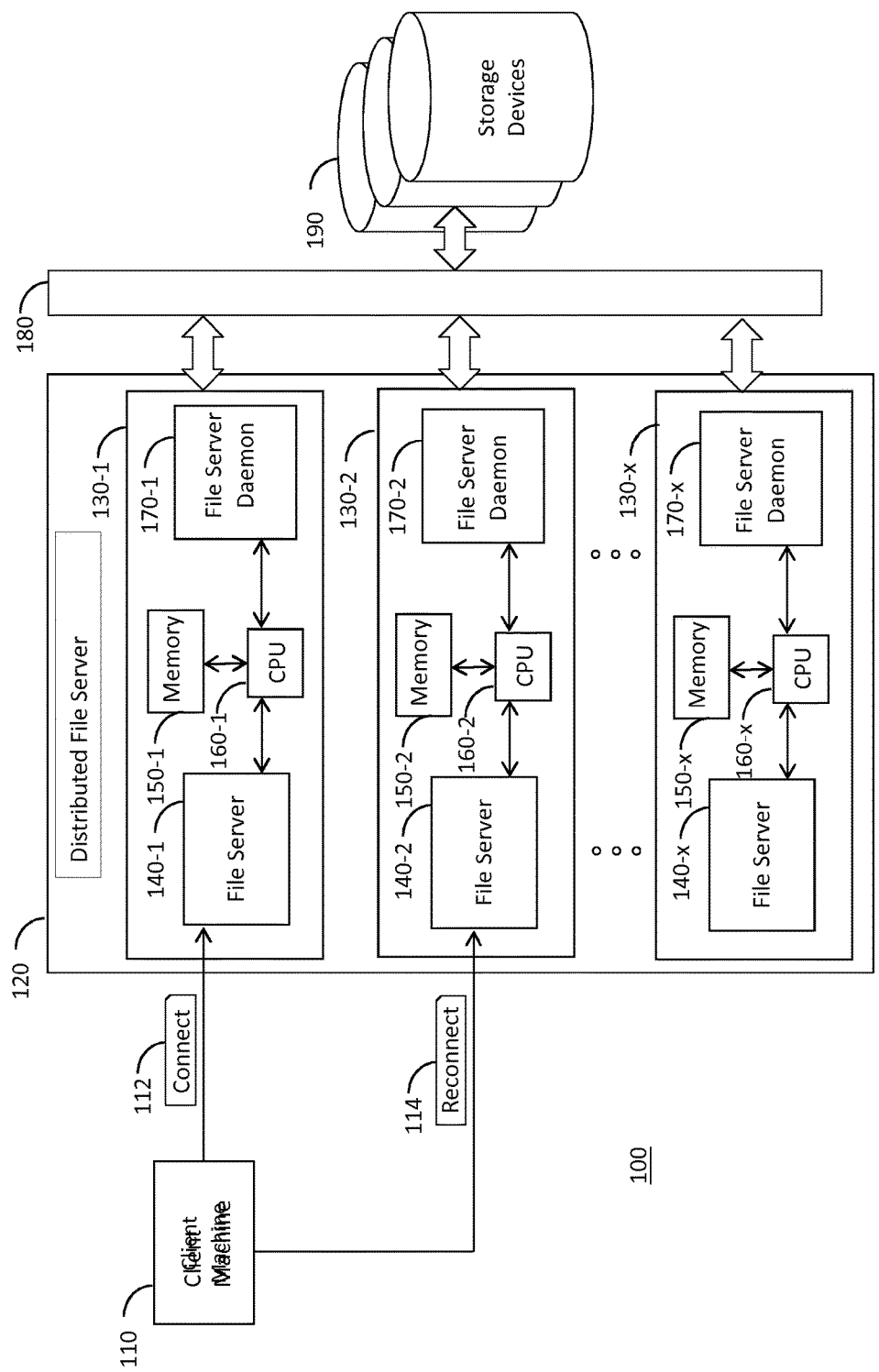
FIG. 1 is a block diagram illustrating non-limiting exemplary architecture of a file system in accordance with embodiments of the prior art.
Figure 2:
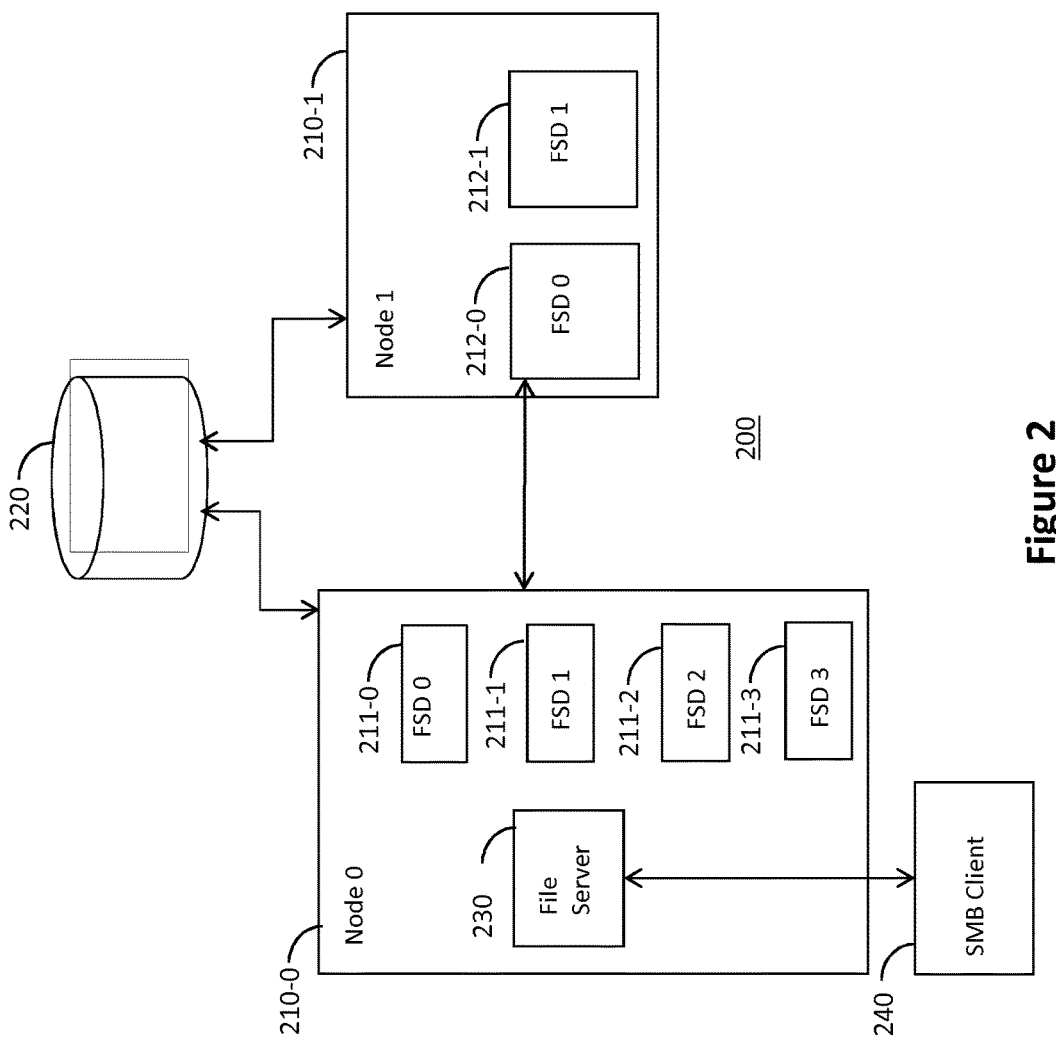
FIG. 2 is a block diagram illustrating non-limiting exemplary architecture of a file system in accordance with embodiments of the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention provide efficient and economical method and mechanism for execution of client-initiated operations on file handles in a distributed server system by allocation of cluster wide unique SMB2 handle IDs that enables faster locating.

The present invention takes advantage of existing product architecture in order to position file state and encode into SMB2 file handle identifiers, returned to client, the exact file state location.

According to some embodiments of the present invention, a distributed file system is provided. Distributed file system includes a plurality of nodes, each having a computer processor, a memory, and a plurality of processes executed by the computer processor, wherein the nodes are connected via a network interface to at least one storage device; a first process of the plurality of processes configured to generate a file handle, responsive to a file connect request sent by a client to a distributed file system, wherein the handle has a handle identifier that is unique throughout the distributed file system; a second process of the plurality of processes configured to embed a protocol server identifier within the handle identifier, wherein the protocol server identifier relates to a protocol server to which the handle is assigned, wherein the protocol server is a data structure containing a list of all handles that belong to a specific file wherein the handles are still valid; a third process of the plurality of processes configured to send a file system operation request from the client to the distributed file system, wherein the file system operation request includes the handle identifier; and a fourth process of the plurality of processes configured to locate the protocol server based on the protocol server identifier embedded within the handle identifier upon receiving the file system operation request at the distributed file system.

According to some embodiments of the present invention, the embedding of the protocol server identifier within the handle identifier complies with Server Message Block (SMB) network protocol.

According to some embodiments of the present invention, the protocol server identifier may be indicated on a part of a field at the file system operation request reserved by the SMB network protocol to the handle identifier.

According to some embodiments of the present invention, an SMB server may reside on the node at which the file system operation request is received wherein the SMB server is configured to carry out the locating of the protocol server based on the protocol server identifier embedded within the handle identifier.

According to some embodiments of the present invention, the protocol server is located on a node other than the node at which the file system operation request is received.

Figure 3:
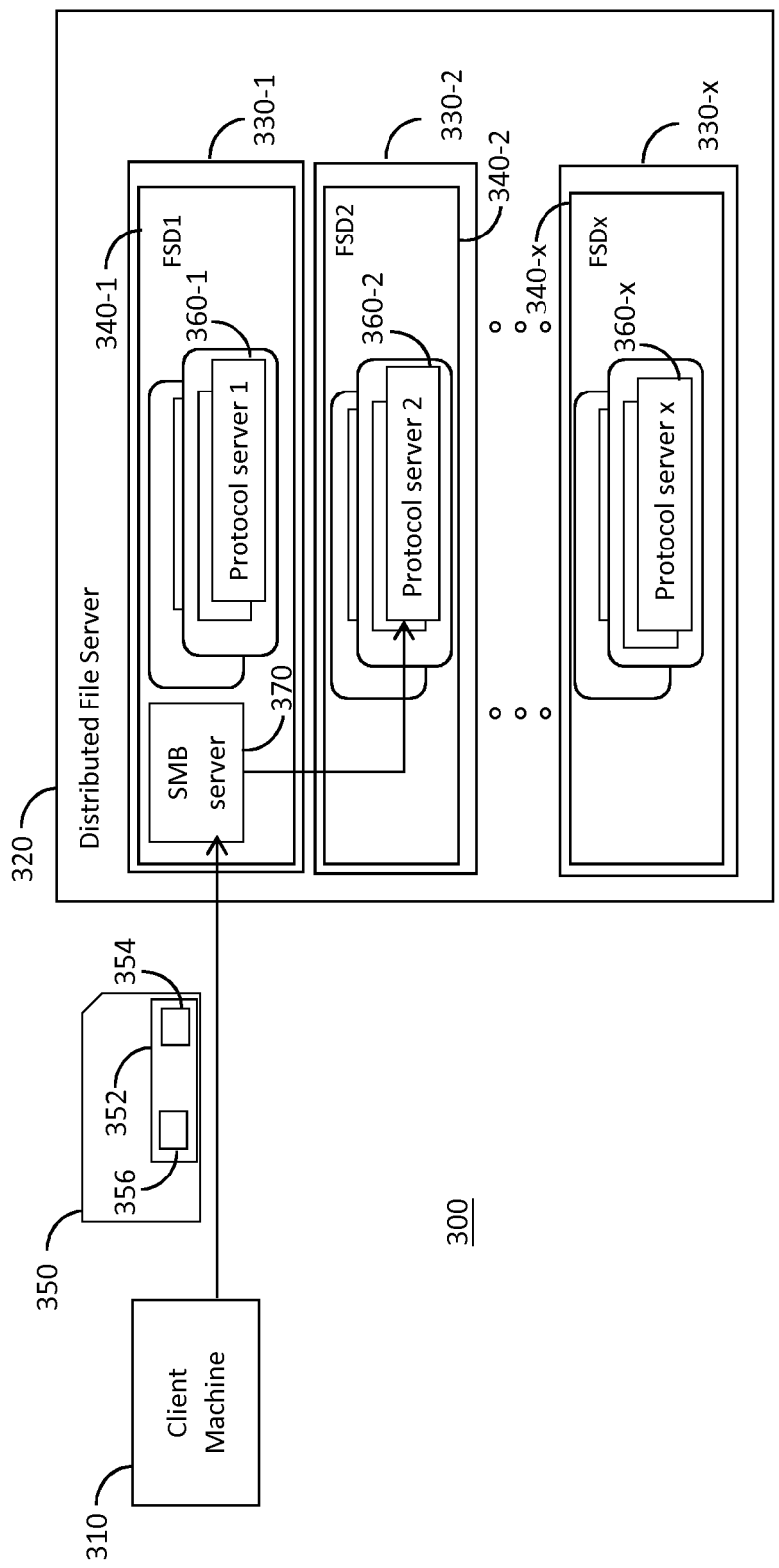
FIG. 3 is a block diagram illustrating non-limiting exemplary architecture of a file system in accordance with embodiments of the present invention.

FIG. 3 is a block diagram illustrating the aforementioned system according to some embodiments of the present invention. SMB compliant architecture 300 may include a client machine 310 and a distributed file server 320. Distributed file server may 320 include a plurality of nodes 330-1 to 330-x, each node runs several FSDs 340-1 to 340-x (for the sake of simplicity, only one FSD is shown herein per node).

Additionally, at least one protocol server 360-1 to 360-x resides on each FSD 340-1 to 340-x. A protocol server such as 360-1 is defined herein in accordance with embodiments of the present invention not as process but rather a module or a data structure. The protocol server such as 360-1 contains a list of all handles that belong to a specific file and are still valid. Each of protocol servers such as 360-1 x can operate on a separate process or share the process with other protocol servers 360-2 to 360-x.

Additionally, and in accordance with the SMB compliant architecture 300, at least one of the nodes 330-1 to 330-x on distributed file server 320 may include an SMB server 370. In operation, when a file is first requested by a client, a handle is created and assigned to one of the protocol servers. Each handle that is assigned to a specific protocol server has a handle ID such as 352 that is unique within the specific protocol server.

Embodiments of the present invention may provide a system-wide unique ID of the handle. In other words, no other handle in the entire system 320 may have the same handle ID such as 352.

When a client 310 wishes to execute an operation on an allocated file handle it sends a request 350 to the SMB server 360. According to embodiments of the present invention, a preconfigured protocol server identifier 354, respective to the protocol server (in this case protocol server 360-2) to which the handle is assigned, is embedded in the handle ID 354 that is conveyed with the file system operation request 350 which may be a file connect or reconnect request and the like. Another unique identifier, called internal handle ID 356 is also provided on handle ID 352. Internal handle ID 356 is used to identify the handle within the protocol server (in this case protocol server 360-2).

Figure 4:
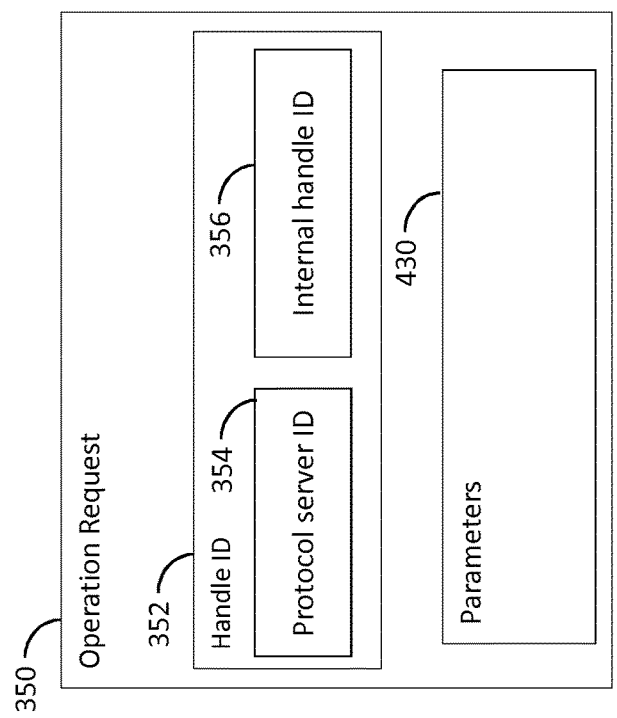
FIG. 4 is protocol structure diagram illustrating an aspect according to embodiments of the present invention.

FIG. 4 is a schematic illustration of a structure of an operation request sent by an SMB client, according to embodiments of the present invention. Operation request 350 includes a handle ID 352 and other parameters 430 required in order to execute the operation. As explained above, handle ID 352 itself includes a protocol server ID 354 which is a unique identifier for the specific protocol server on which the handle associated with handle ID 352 is stored. An additional field is the internal handle ID 356 which is a unique identifier of the handle within protocol server data structure. Embodiments of the present invention take advantage of available field space on the handle ID, to include both protocol server ID 354 and internal handle ID 356.

In operation, when SMB client sends the SMB server the operation request handle ID 354, SMB server decipher the specific protocol server associated with the protocol server ID. The protocol server is where the handles themselves are being stored. Then, when a certain request arrives to a specific protocol server it retrieves the handle structure from protocol server internal database. The handle is retrieved by internal handle ID stored on the handle ID. The operation is then executed on the retrieved handle.

FIG. 5 is a high level flowchart illustrating non-limiting exemplary method in accordance with embodiments of the present invention. Method 500 may include the following steps: generating a file handle, responsive to a file connect request sent by a client to a distributed file system, wherein the handle has a handle identifier that is unique throughout the distributed file system 510; embedding a protocol server identifier within the handle identifier, wherein the protocol server identifier relates to a protocol server to which the handle is assigned, wherein the protocol server is a data structure containing a list of all handles that belong to a specific file wherein the handles are still valid 520; sending a file system operation request from the client to the distributed file system, wherein the file system operation request includes the handle identifier 530; and locating the protocol server based on the protocol server identifier embedded within the handle identifier upon receiving the file system operation request at the distributed file system 540.

It should be noted that the method according to embodiments of the present invention may be stored as instructions in a computer readable medium to cause processors, such as central processing units (CPU) 160-1 to 160-x, on nodes 130-1 to 130-x to perform the method. Additionally, the method described in the present disclosure can be stored as instructions in a non-transitory computer readable medium, such as storage devices 190 which may include hard disk drives, solid state drives, flash memories, and the like. Additionally non-transitory computer readable medium can be memory units 150-1 to 150-x which reside on nodes 130-1 to 130-x of distributed file server 120.

In accordance with embodiments of the present invention, a non-transitory computer readable medium may include a set of instructions that when executed cause at least one processor to: generate a file handle, responsive to a file connect request sent by a client to a distributed file system, wherein the handle has a handle identifier that is unique throughout the distributed file system; embed a protocol server identifier within the handle identifier, wherein the protocol server identifier relates to a protocol server to which the handle is assigned, wherein the protocol server is a data structure containing a list of all handles that belong to a specific file wherein the handles are still valid; send a file system operation request from the client to the said distributed file system, wherein the file system operation request includes the handle identifier; and locate the protocol server based on the protocol server identifier embedded within the handle identifier upon receiving the file system operation request at the distributed file system.

In order to implement the method according to embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   generating a file handle, when a file is first requested by a client to a distributed file system, wherein the file handle has a handle identifier that is unique throughout said distributed file system;
   embedding a protocol server identifier within the handle identifier, wherein said protocol server identifier relates to a protocol server to which the file handle is assigned, wherein the protocol server is a data structure containing a list of all file handles that belong to the file wherein said file handles are still valid, wherein the handle identifier further comprises an internal handle identifier which is a unique handle identifier configured to identify the file handle within the protocol server, wherein the embedding of said protocol server identifier within the handle identifier complies with Server Message Block (SMB) network protocol;
   sending a file system operation request from said client to the said distributed file system, wherein said file system operation request includes said handle identifier; and
   locating the protocol server based on the protocol server identifier embedded within the handle identifier upon receiving said file system operation request at the distributed file system.

2. The method according to claim 1, wherein the file system operation comprises one of: file connect operation, file reconnect operation, and file disconnect operation.

3. The method according to claim 1, wherein the protocol server identifier is indicated on a part of a field at the file system operation request reserved by the SMB network protocol to the handle identifier.

4. The method according to claim 1, wherein the locating the protocol server based on the protocol server identifier embedded within the handle identifier is carried out by an SMB server residing on a node at which said file system operation request is received.

5. The method according to claim 4, wherein said protocol server is located on a node other than the node at which said file system operation request is received.

6. A system comprising:
   a file system comprising a plurality of nodes, each having a computer processor, a memory, and a plurality of processes executed by said computer processor, wherein the nodes are connected via a network interface to at least one storage device;
   a first process of the plurality of processes configured to generate a file handle, when a file is first requested by a client to a distributed file system, wherein the file handle has a handle identifier that is unique throughout said distributed file system;
   a second process of the plurality of processes configured to embed a protocol server identifier within the handle identifier, wherein said protocol server identifier relates to a protocol server to which the file handle is assigned, wherein the protocol server is a data structure containing a list of all file handles that belong to the file wherein said file handles are still valid, wherein the handle identifier further comprises an internal handle identifier which is a unique handle identifier configured to identify the file handle within the protocol server, wherein the embedding of said protocol server identifier within the handle identifier complies with Server Message Block (SMB) network protocol;
   a third process of the plurality of processes configured to send a file system operation request from said client to the said distributed file system, wherein said file system operation request includes said handle identifier; and
   a fourth process of the plurality of processes configured to locate the protocol server based on the protocol server identifier embedded within the handle identifier upon receiving said file system operation request at the distributed file system.

7. The system according to claim 6, wherein the file system operation comprises one of: file connect operation, file reconnect operation, and file disconnect operation.

8. The system according to claim 6, wherein the protocol server identifier is indicated on a part of a field at the file system operation request reserved by the SMB network protocol to the handle identifier.

9. The system according to claim 6, further comprising an SMB server residing on a node at which said file system operation request is received wherein said SMB server is configured to carry out the locating of said protocol server based on the protocol server identifier embedded within the handle identifier.

10. The system according to claim 9, wherein said protocol server is located on a node other than the node at which said file system operation request is received.

11. A non-transitory computer readable medium comprising a set of instructions that when executed cause at least one processor to:
   generate a file handle, when a file is first requested by a client to a distributed file system, wherein the file handle has a handle identifier that is unique throughout said distributed file system;
   embed a protocol server identifier within the handle identifier, wherein said protocol server identifier relates to a protocol server to which the file handle is assigned, wherein the protocol server is a data structure containing a list of all file handles that belong to the file wherein said file handles are still valid, wherein the handle identifier further comprises an internal handle identifier which is a unique handle identifier configured to identify the file handle within the protocol server, wherein the embedding of said protocol server identifier within the handle identifier complies with Server Message Block (SMB) network protocol;

send a file system operation request from said client to the said distributed file system, wherein said file system operation request includes said handle identifier; and locate the protocol server based on the protocol server identifier embedded within the handle identifier upon receiving said file system operation request at the distributed file system.

12. The non-transitory computer readable medium according to claim 11, wherein the file system operation comprises one of: file connect operation, file reconnect operation, and file disconnect operation.

13. The non-transitory computer readable medium according to claim 11, wherein the protocol server identifier is indicated on a part of a field at the file system operation request reserved by the SMB network protocol to the handle identifier.

14. The non-transitory computer readable medium according to claim 11, wherein the set of instructions that when executed cause the at least one processor to locate said protocol server based on the protocol server identifier embedded within the handle identifier is carried out by an SMB server residing on a node at which said file system operation request is received.

15. The non-transitory computer readable medium according to claim 11, wherein said protocol server is located on a node other than the node at which said file system operation request is received.

* * * * *